United States Patent [19]
Williams

[11] Patent Number: 6,131,851
[45] Date of Patent: Oct. 17, 2000

[54] APPARATUS HAVING AN ENERGY GENERATING SKIN AS AN OUTER COVERING

[75] Inventor: Laurence Williams, Orlando, Fla.

[73] Assignee: Lockheed Martin Corporation, Bethesda, Md.

[21] Appl. No.: 09/088,846

[22] Filed: Jun. 2, 1998

[51] Int. Cl.[7] .................................................. B64B 1/00
[52] U.S. Cl. ................................ 244/58; 244/61; 429/33
[58] Field of Search ........................... 244/58, 61, 53 R, 244/60, 62, 126, 30; 429/33

[56] References Cited

U.S. PATENT DOCUMENTS

| | | | |
|---|---|---|---|
| 3,023,259 | 2/1962 | Coler et al. | 136/6 |
| 3,375,136 | 3/1968 | Biggar | 136/6 |
| 3,615,948 | 10/1971 | Krostewitz | 429/33 |
| 3,897,032 | 7/1975 | Papst | 244/61 |
| 3,937,424 | 2/1976 | Meier et al. | 244/53 |
| 4,175,165 | 11/1979 | Adlhart | 429/39 |
| 4,364,532 | 12/1982 | Stark | 244/30 |
| 4,415,133 | 11/1983 | Phillips | 244/53 |
| 4,614,695 | 9/1986 | Ibbott | 429/127 |
| 4,768,739 | 9/1988 | Schnee | 244/146 |
| 4,907,764 | 3/1990 | Long | 244/62 |
| 4,977,007 | 12/1990 | Kondo et al. | 428/76 |
| 5,234,777 | 8/1993 | Wilson | 429/33 |
| 5,246,792 | 9/1993 | Watanabe | 429/33 |
| 5,302,269 | 4/1994 | Eisman et al. | 204/252 |
| 5,336,570 | 8/1994 | Dodge, Jr. | 429/31 |
| 5,348,254 | 9/1994 | Nakada | 244/97 |
| 5,350,643 | 9/1994 | Imahashi et al. | 429/33 |
| 5,372,896 | 12/1994 | Binder et al. | 429/33 |
| 5,403,675 | 4/1995 | Ogata et al. | 429/33 |
| 5,472,799 | 12/1995 | Watanabe | 429/30 |
| 5,509,942 | 4/1996 | Dodge | 429/33 |
| 5,525,436 | 6/1996 | Savinell et al. | 429/30 |
| 5,890,676 | 4/1999 | Coleman et al. | 244/61 |

Primary Examiner—Galen L. Barefoot
Attorney, Agent, or Firm—Burns, Doane, Swecker & Mathis, LLP

[57] ABSTRACT

The invention relates to an outer covering of an apparatus made of an energy generating skin. The energy generating skin encloses a fuel that is capable of reacting with oxygen in an electrochemical reaction to form electricity and gaseous products. In preferred embodiments, the energy generating skin is a hydrogen oxygen fuel cell which serves as the outer covering of an aircraft such as a lighter than air ship or an airplane.

17 Claims, 1 Drawing Sheet

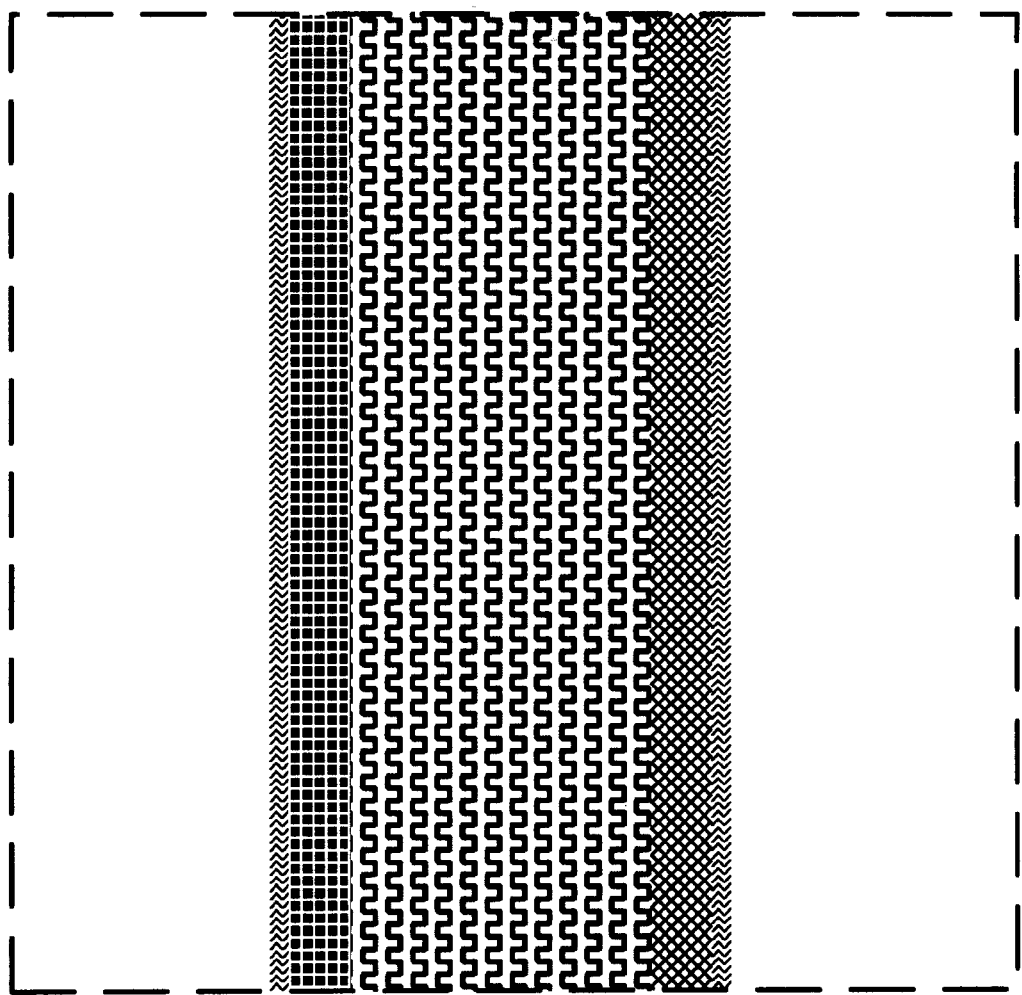
FIGURE

APPARATUS HAVING AN ENERGY GENERATING SKIN AS AN OUTER COVERING

FIELD OF THE DISCLOSURE

The invention relates to an apparatus having an outer covering or skin which generates electrical energy. In preferred embodiments, the apparatus is a vehicle having an outer skin that generates electricity to operate an electrically powered device, such as a propulsion device.

BACKGROUND OF THE DISCLOSURE

Today, virtually all high power mobile systems use an energy source based on the combustion of a fuel with air to generate a gas at a high temperature and pressure. The high pressure, high temperature gas is allowed to expand and do work on pistons or turbine blades that extract the desired energy. These energy sources are categorized as heat engines. The pistons and turbines are metallic structures with dedicated mass and bulk specifically designed for the extraction of energy. These devices cover a broad range of energy production per unit mass. The lightest devices achieve an energy production in the range of 0.50 watts per gram. The maximum efficiency of heat engines seldom exceeds approximately 40%. This efficiency is achieved only within a narrow range of operating conditions.

Electrically powered vehicles are an alternative to heat engines, but have drawbacks of their own. Vehicles which employ photovoltaic cells to generate electricity are well-known. These vehicles require sunlight to generate electricity using the photovoltaic cells. Such vehicles are of limited usefulness in the absence of light. For example, U.S. Pat. No. 5,518,205 discloses a solar powered aircraft. This aircraft employs means for positioning the solar cells for optimal sun exposure. Energy is stored for night use in batteries. Alternatively, energy is obtained at night by using a hydrogen/oxygen fuel cell located inside the aircraft.

U.S. Pat. No. 5,348,254 discloses a long period floating airship which employs a solar cell battery during the daytime, and requires the use of a hydrogen engine during the night.

U.S. Pat. No. 4,907,764 discloses an aircraft with external cells powered by long wavelength infra-red radiation from earth.

U.S. Pat. No. 4,768,738 discloses a solar powered aircraft having a flexible skin capable of transforming solar energy into electricity. The electrical energy must be stored by the use of a battery.

U.S. Pat. No. 4,415,133 discloses a solar powered aircraft having photovoltaic cells on the surface of the wings. Again, batteries must be used to store energy for night use.

U.S. Pat. No. 4,364,532 discloses a collector for high altitude collection of solar energy to be used to power a balloon, or airship.

Another option for energy generation is battery generation. In this regard, U.S. Pat. No. 3,937,424 discloses energy generation by use of a battery which forms a portion of the wing.

Fuel cells offer a viable energy generating alternative to heat engines, solar power and battery storage. Fuel cells, in their simplest form, contain two electrodes layers encasing an electrolyte layer. An oxidizing fuel (liquid or gas) is placed on one side of the cell, and a reducing fuel (liquid or gas) is placed on the other side of the cell. The electrolyte between the electrodes can be for example, solid oxides, molten salts, or solid polymer electrolytes. Solid polymer electrolytes are particularly useful because they do not require the special encapsulation measures needed for molten salt electrolytes. Further, solid polymer electrolytes are operable at low temperatures unlike solid oxide electrolytes.

Simple fuel cells use oxygen and hydrogen as the fuels. On the hydrogen side of the cell, hydrogen reacts to produce electrons and hydrogen ions as follows:

$$H_2 \Rightarrow 2H^+ + 2e^-$$

On the oxygen side of the cell, oxygen reacts with electrons and water in the electrolyte to form hydroxyl ions:

$$O_2 + 2H_2O + 4e^- \Rightarrow 4OH^-$$

Within the electrolyte, hydroxyl ions and hydrogen ions react to form water:

$$OH^- + H^+ \Rightarrow H_2O$$

The electrons flow through the external circuit forming a power source.

The fuel cell energy generating process is not limited by the same thermodynamic factors that limit heat engines. Fuel cell efficiency is nearly linear with load. When the power drain is low, the efficiency approaches 100%. Valuable levels of output can be achieved at efficiencies between 40 and 80%.

In the context of energy production for vehicles, these cells are generally stacked to form an electricity generating assembly (see, e.g., U.S. Pat. No. 4,175,165). Typically, fans or ducts are necessary to force air over the cells to produce energy.

SUMMARY OF THE DISCLOSURE

In contrast to the prior art use of the fuel cells in a stacked arrangement, the present invention relates to the use of fuel cells to serve double duty as the outer covering of an apparatus and as a means for generating electrical energy.

In one embodiment, the invention relates to an apparatus having an exterior covering formed at least partially of an energy generating skin. The energy generating skin encloses a fuel capable of reacting with oxygen by an electrochemical process to form gaseous products and electricity.

In another embodiment, the invention relates to a vehicle having an electrically powered device such as a propulsion device. The vehicle has an exterior covering formed at least partially of an energy generating skin. The energy generating skin supplies electric power to the electrically powered device by an electrochemical process. Preferably, the energy generating skin encompasses a fuel capable of reaction with oxygen in order to generate electricity and gaseous products.

In another embodiment, the invention relates to a lighter than air ship. The lighter than air ship has an exterior covering formed at least partially of an energy generating skin. The exterior covering encompasses a gas capable of providing lift to the lighter than air ship. The lighter than air ship desirably has a propulsion device which may be powered at least partially by electricity generated by the energy generating skin. The gas capable of providing lift may be hydrogen gas, and the energy generating skin may be a hydrogen oxygen fuel cell fueled on one side by the hydrogen gas and on the other side by oxygen from ambient air.

In yet another embodiment, the invention relates to an airplane having wings formed by an exterior covering which may at least partially be formed of an energy generating skin. The exterior covering may encompass an internal space filled at least partially with a hydrogen source. The energy generating skin is a hydrogen-oxygen fuel cell fueled on one side desirably with a hydrogen source, and on the other side desirably with oxygen from the ambient air.

BRIEF DESCRIPTION OF THE DRAWING

FIG. 1 is a schematic of a hydrogen-oxygen fuel cell capable of being used as the energy generating skin of the present invention.

DETAILED DESCRIPTION OF THE DISCLOSURE

The invention relates to an apparatus having an exterior covering which is at least partially an energy generating skin. The energy generating skin may encompass a space containing a fuel that is capable of reacting with oxygen by an electrochemical reaction to form electricity. The energy generating skin harnesses the electrical energy generated by the electrochemical reaction between the fuel and the oxygen using a fuel cell.

The apparatus which uses the energy generating skin of the present invention can be any apparatus in which it is beneficial to generate electricity. Such apparatuses include, but are not limited to vehicles such as ground, water-based or air vehicles. The inventive skin is most useful in applications that require a light-weight energy source. Thus, the energy generating skin of the present invention is preferably used for aircraft, including aircraft for military, civilian and commercial uses. It can be used with rotary wing, fixed wing and lighter than air systems. The use of a fuel cell as the source of mobile energy applied in the unique manner described in the present invention mitigates many of the limitations generated by the use of mechanically complex heat engines.

The electricity generated by the energy generating skin can be used to power any electrically operable device. When used as the exterior covering of a vehicle, this device may include but is not limited to a propulsion device for the vehicle, or a battery which stores energy. The propulsion device is not critical to the invention and may be one or more propulsion means that utilize electrical energy, alone or in combination with some other form of energy, to propel a vehicle.

The fuel enclosed within the energy generating skin and which powers the fuel cell can be any fuel capable of reacting with oxygen in an electrochemical reaction when used in combination with the fuel cell. The fuel can be a liquid or a gas. Preferably, the fuel is a source of hydrogen. Examples of hydrogen sources are hydrogen gas, ammonia, hydrazine, or any compound made of hydrogen, carbon, nitrogen and oxygen. Hydrogen gas is the preferred fuel.

The oxygen which reacts with the fuel in an electrochemical process may come from any source. However, because the invention is primarily related to earth-bound vehicles, ambient air is the preferred source of oxygen.

The invention will now be described as it relates to preferred embodiments of uses of the energy generating skin.

The energy generating skin of the present invention is particularly useful as a portion of the exterior outer covering of a lighter than air ship. The energy generating skin may be all or part of an exterior covering of the lighter than air ship that encompasses a gas capable of providing lift. Preferably the gas capable of providing lift is hydrogen gas. In this manner, the hydrogen gas serves the dual purpose of fueling the energy generating skin and providing lift for the lighter than air ship. Oxygen is provided to the energy generating skin by the ambient air. The energy generating skin produces electricity that powers a propulsion device attached to the lighter than air ship. As one of ordinary skill in the art of aircraft manufacture will appreciate, such a lighter than air ship can be made remotely pilotable. A remotely pilotable lighter than air ship is useful in military applications such as reconnaissance or lethal payload delivery.

In an aircraft which utilizes surfaces to create lift such as a fixed wing airplane, the energy generating skin may cover at least a portion of the lifting surfaces. In an alternate embodiment, the energy generating skin may cover at least a portion of the fuselage of an airplane. The electricity generated by the energy generating skin may be used to power an electrically powered device, such as batteries or an electrically powered propulsion device.

In one embodiment, the energy generating skin is flexible. The flexible skin may be applied to aircraft wings in a manner similar to the use of cloth wing coverings. Further, the flexible skin can be used as the outer covering of an inflatable lighter than air ship.

By using the energy generating skin, the parasitic weight of the power source of a lighter than air ship or a conventional aircraft is largely eliminated.

The principle of operation of a fuel cell which comprises the energy generating skin is shown in FIG. 1. The fuel cell has a minimum of three layers (two electrodes and an electrolyte), however, additional layers such as catalyst layers may offer advantages.

A source of oxygen 1 supplies oxygen to the outer electrode 2. Any atmosphere that supplies sufficient oxygen to the outer electrode 2 will work with the present invention, however, because the invention is primarily related to earth-bound vehicles, air is the preferred atmosphere.

When air is used to provide oxygen to the outer electrode 2, the air preferably flows past the outer electrode 2. Maintaining a flow of oxygen aids in the continuous generation of electricity. This is because the fuel cell extracts oxygen from the air, leaving inert nitrogen. If air flow does not occur, the cell may be starved of oxygen. Maintaining air flow past the outer electrode 2 purges the inert nitrogen.

The outer electrode 2 is an electrode that conducts the electrical energy to the outer side of the cell. The outer electrode 2 must be sufficiently porous so that oxygen may pass through it. So long as the above criteria are met, the materials used for the air side electrode are not critical. In one embodiment, metal may be vapor deposited on the electrolyte surface to form the electrodes. In a second embodiment, a multitude of very small holes may be etched in a metal layer to allow the gas to reach the electrolyte. In another embodiment, metal foils with many fine perforations may be used. Metal screen, cloth, or felts of metal fibers are also suitable. The preferred electrode materials are those metals that are relatively chemically inert and are good conductors of electricity. Metals such as gold, platinum and silver are excellent electrode metals but are expensive. Copper and nickel are suitable and are less costly. In yet another embodiment, screens, cloth, or felts of carbon fibers may be employed. Electrodes may also be formed of powdered metals or graphitic carbon that has been pressed into sheet. Further, any combination of these materials may be used for the electrode material. Depending on the application, it may be preferred to use different electrode materials for different parts of the skin.

The electrodes collect the current generated over the surface of the fuel cell and carry it to a main bus bar. The electrodes may be fabricated in a dendridic configuration that minimizes the tendency of the electrode material to block the flow of gas to the surface of the electrolyte. At the extremes of the electrical path the electrode may be very thin, for example 1–10 microns of a metal deposited on the surface of the electrolyte. The current is collected in the dendridic structure and the electrode may become thicker until near the bus bar the electrode layer may be several millimeters thick.

Optional catalyst layers 3 and 5 activate the oxygen and hydrogen source. The catalyst layers 3 and 5 are not strictly necessary, however, catalysts may greatly enhance the rate at which the chemical reactions occur at the interface between the electrodes and the electrolyte, and thus, improve the power efficiency of the cell. If employed in the energy generating skin, the catalyst layers 3 and 5 may contain a catalytically active species. In addition, the catalyst layers may contain a binder, such as polytetrafluoroethylene, and/or a proton conductor, such as perfluorosulfonic acid ion-exchange resin. Examples of catalytically active species are metals, metal oxides, metal alloys, and mixtures thereof. Examples of particularly useful metals are the platinum group metals (ruthenium, rhodium, palladium, osmium, iridium and platinum), nickel, iron, copper, silver and rare earth metals. The catalytically active species can be in the fuel cell in any form or in any amount that sufficiently activates the hydrogen or oxygen. The catalyst may be placed between the electrodes and the electrolyte at the molecular level. For example, catalysts may be vapor deposited on the surface of the electrolyte. The catalyst may also be vapor deposited or chemically coated on the surfaces of the electrodes. Other examples of suitable forms of catalyst species include a powder or a catalyst supported on a carrier such as carbon powder.

The solid electrolyte 4 conducts electricity by an ionic mobility mechanism. One of ordinary skill in the art can select a material for the solid electrolyte 4 to be compatible with the particular fuel in use. For example, in the case of a hydrogen oxygen cell, the electrolyte 4 must be capable of dissolving positive hydrogen ions, negative hydroxyl ions and water. One example of a good candidate solid polymer electrolyte is provided by NAFION™ a product supplied by DuPont Chemical. This polymer has a tetrafluorethylene (TEFLON™) backbone with pendant sulfuric acid groups. Other examples of suitable solid electrolytes 4 include phenol formaldehyde resin, polystyrene-divinvyl benzene copolymer, urea-formaldahyde resin, melamine formaldehyde resin, sulfonated polystyrenes, sulfonated polyphenylene oxide (disclosed in U.S. Pat. No. 5,403,675, hereby incorporated herein by reference), polybenzylimidazoles (disclosed in U.S. Pat. No. 5,525,436, hereby incorporated by reference) and carboxylic acid cation exchange resins such as perfluorocarboxylic acid resin. U.S. Pat. No. 5,302,269 provides a useful summary of solid electrolytes, and is incorporated herein by reference.

The thickness of the electrolyte layer may be determined from several competing factors. From the standpoint of the electrochemical reaction it should be as thin as is feasible because its thickness contributes to the internal resistance of the cell. The higher the internal resistance the less efficient the cell. However, very thin electrolyte layers allow the hydrogen to diffuse through the thickness of the electrolyte without reacting. This diffusion reduces the efficiency is of the cell.

For the energy generating skin of the present invention, the solid polymer electrolyte serves a secondary function as part of the outer surface of the device of which it is a part. This structural requirement and the physical strength properties of the electrolyte will drive the thickness of the electrolyte layer. For many of the applications envisioned, such as air planes and lighter than air ships, the electrolyte thickness may range from 0.1 millimeter to 2 millimeters.

Fuel side electrode 6 conducts the electrical energy to the fuel side of the cell. The fuel side electrode must be sufficiently porous to allow fuel diffusion. The materials and thicknesses listed for the outer electrode 2 are equally useful for the fuel side the electrode.

For operation, a fuel source 7 must be supplied to the fuel side electrode 6. The fuel may be gaseous or liquid and is preferably a hydrogen source. Examples of hydrogen sources include gaseous hydrogen, ammonia, hydrazine or any compound comprising hydrogen, carbon, nitrogen, and oxygen. The preferred hydrogen source is hydrogen gas. The use of some fuels may require stirring of the fuel to maintain a steady reaction at the fuel side electrode 6 and removal of other reaction products, however, if hydrogen gas is used as the hydrogen source, no stirring is necessary.

The fuel is generally included within a fuel supply chamber. The fuel supply chamber is generally formed as at least a portion of the internal space of the apparatus. For example, the fuel supply chamber may be formed as the internal structure of a lighter than air ship having an energy generating skin. In another embodiment, the hydrogen supply chamber is formed by the internal space within an aircraft wing or fuselage covered with the energy generating skin.

When the fuel is a gaseous fuel, the fuel source 7 inside the fuel supply chamber can be placed under a pressure greater than ambient pressure. By pressurizing the fuel source 7, the stiffness of the energy generating skin can be increased. In a preferred embodiment of a lighter than air ship, a positive pressure of hydrogen inflates the energy generating skin as well as provides buoyancy to the lighter than air vehicle.

The process by which the energy generating skin of the present invention extracts electrical energy from chemical reactions will now be described with respect to a hydrogen oxygen fuel cell using gaseous hydrogen as the fuel source. Again referring to FIG. 1, the chemical reactions at the two electrodes are described as follows.

At the fuel electrode 6, hydrogen reacts to produce electrons and hydrogen ions:

$$H_2 \Rightarrow 2H^+ + 2e^-$$

At the outer electrode 2, oxygen reacts with electrons and water in the electrolyte to form hydroxyl ions:

$$O_2 + 2H_2O + 4e^- \Rightarrow 4OH^-$$

Within the electrolyte hydroxyl ions and hydrogen ions react to form water:

$$OH^- + H^+ \Rightarrow H_2O$$

The electrons flow through the external circuit and perform electrical work, such as powering an electrical device.

The thickness of the cell shown in FIG. 1 was arbitrarily shown as one millimeter. Thin cells have a lower internal resistance and are thus, up to a point, more efficient. The limiting factor that presents the fuel cell from approaching zero thickness and 100% efficiency is the tendency for the hydrogen to diffuse through a thin electrolyte layer without reacting. As noted above, the electrolyte may range in thickness from 0.1 millimeter to 2 millimeters. The fuel cell thickness may vary from about 10% greater than the electrolyte at the extreme ends of the dendridic structure of the electrodes that collect the energy generated. As you scan toward the bus bar, the fuel cell may be thicker as the electrode becomes thicker to accommodate the greater flow of electric current. At the junction of the electrode with the bus bar that will carry the electric current to propulsion devices or communications modules, the fuel cell may be several millimeters thick. The actual thickness will depend on the total surface of the cell being accessed and the amount of current carried by the electrode.

To produce the fuel cell modules used to make energy generating skin, the optional catalytic layers 3 and 5 and the electrode layers 2 and 6 are applied to the solid polymer electrolyte 4 in a manner similar to that used to make printed circuit boards, i.e., pastes of the components are screen printed onto the solid electrolyte and then the pastes are heated to consolidate the pastes into layers.

The critical figure of merit for a fuel cell in the current flow per unit area, commonly expressed as amperes per square centimeter. Fuel cells produce electricity at a potential of about 0.2 to 1 volt and current flows up to about 2.0 amperes per square centimeter.

As an example, at a current of 0.25 amperes per square centimeter each square meter of surface will produce about 2500 VA (watts) and consume about 0.025 grams of hydrogen per second. Applying this to an example of a small airplane provides the following characteristics. Assume the airplane has a 10 meter wing spread and each wing is 2 meters deep. This provides a total upper surface area of 20 square meters and another 20 on the bottom for a total of 40 square meters. At 2500 watts per meter the wing surface can produce 100,000 watts or 134 horse power. At this power level, the hydrogen consumption rate is 1 gram per second or 3.6 kilograms per hour. This level of power is sufficient to power an airplane of this size. The weight of the fuel cell is nearly free because a wing covering is required to produce lift. The motion of the wings of the airplane through the air will provide more than sufficient stirring of the air stream necessary to ensure an adequate supply of oxygen to the fuel cell.

Although the present invention has been described with reference to particular embodiments, it is in no way limited thereby. On the contrary, modifications and variants will be apparent to the person skilled in the art in the context of the claims below.

I claim:

1. An vehicle comprising:
   an exterior covering defining, at least in part, an outermost surface of the vehicle formed at least partially of an energy generating skin,
   said exterior covering encompassing a fuel which reacts with oxygen in an electrochemical process to generate electrical power used by said vehicle.

2. The vehicle of claim 1, wherein said fuel capable of reacting with oxygen is a hydrogen source.

3. The vehicle of claim 2, wherein the hydrogen source is hydrogen gas, ammonia or hydrazine.

4. The vehicle of claim 3, wherein the hydrogen source is hydrogen gas.

5. The vehicle of claim 1, wherein the fuel capable of reacting with oxygen is at a pressure greater than ambient pressure.

6. A vehicle comprising:
   an electrically powered device; and
   an exterior covering defining, at least in part, an outermost surface of the vehicle formed at least partially of an energy generating skin which supplies electric power to the electrically powered device, the outer covering encompassing a space comprising a fuel capable of reacting with oxygen in an electrochemical process to generate said electric power.

7. The vehicle of claim 6, wherein the vehicle is a land-based vehicle, a water-based vehicle or an aircraft.

8. The vehicle of claim 6, wherein the vehicle is a lighter than air ship.

9. The vehicle according to claim 8, wherein the electrically powered device is a propulsion device attached to the lighter than air ship.

10. The vehicle of claim 8, wherein the fuel capable of reacting with oxygen in an electrochemical process is hydrogen gas, and the hydrogen gas generates lift for the lighter than air ship.

11. The vehicle of claim 6, wherein the vehicle is an airplane having at least one surface capable of providing lift, and the energy generating skin forms at least part of the surface capable of providing lift.

12. The vehicle of claim 6, wherein the vehicle is an airplane having a fuselage and the energy generating skin forms at least a portion of the fuselage.

13. The vehicle of claim 6, wherein the fuel capable of reacting with oxygen in an electrochemical process is hydrogen gas, ammonia or hydrazine.

14. The vehicle of claim 13, wherein the fuel is at a pressure greater than ambient pressure.

15. A lighter than air ship comprising:
   an exterior covering defining, at least in part, an outermost surface of the air ship formed at least partially of an energy generating skin, the exterior covering encompassing a gas capable of providing lift to the lighter than air ship; and
   a propulsion device attached to the lighter than air ship powered at least partially by electricity generated by the energy generating skin;
   wherein the gas capable of providing lift is at least partially hydrogen gas, and the energy generating skin is a hydrogen oxygen fuel cell fueled on one side by said hydrogen gas and on the other side by oxygen from ambient air.

16. The air ship of claim 15, wherein the hydrogen gas is at a pressure greater than ambient pressure.

17. An airplane comprising:
   wings formed by an exterior covering which is at least partially formed of an energy generating skin, said energy generating skin encompassing an internal space filled at least partially with a hydrogen source; and
   a propulsion device;
   wherein the energy generating skin is a hydrogen oxygen fuel cell fueled on one side by said hydrogen source, and on the other side by oxygen from the ambient air.

* * * * *